United States Patent [19]

Todaka et al.

[11] Patent Number: 4,963,981
[45] Date of Patent: Oct. 16, 1990

[54] IMAGE SENSOR DEVICE CAPABLE OF ELECTRONIC ZOOMING

[75] Inventors: Yoshihiro Todaka; Takuya Imaide, both of Yokohama; Toshiro Kinugasa, Hiratsuka; Masaru Noda, Kanagawa, all of Japan

[73] Assignee: Hitachi, Ltd., Tokyo, Japan

[21] Appl. No.: 369,342

[22] Filed: Jun. 21, 1989

[30] Foreign Application Priority Data

Jun. 21, 1988 [JP] Japan .................................. 63-151319

[51] Int. Cl.$^5$ .............................................. H04N 3/14
[52] U.S. Cl. .................................. 358/213.13; 358/180
[58] Field of Search .................... 358/180, 140, 213.26, 358/213.13

[56] References Cited

U.S. PATENT DOCUMENTS

| | | | |
|---|---|---|---|
| 3,935,381 | 1/1976 | Petrocelli et al. | 358/180 |
| 4,002,824 | 1/1977 | Petrocelli et al. | 358/180 |
| 4,426,664 | 1/1984 | Nagumo et al. | 358/213.26 |
| 4,589,029 | 5/1986 | Torimaru et al. | 358/180 |
| 4,706,122 | 11/1987 | Akiyama | 358/213.13 |
| 4,734,772 | 3/1988 | Akiyama | 358/213.13 |

*Primary Examiner*—Stephen Brinich
*Attorney, Agent, or Firm*—Antonelli, Terry, Stout & Kraus

[57] ABSTRACT

In an imager including a sensor of solid state type having photo-elements arranged with a matrix configuration wherein electrical signals are read out from the photo-elements in two-row-at-a-time, the electrical signals are read out from 1st and 2nd rows for the 1st scan line of a display picture, from 3rd and 4th rows for the 2nd scan line, and so forth. In order to obtain a zoomed up picture of an area of a part of the matrix configuration of the photo-elements, there is provided a memory having storage locations whose number is equal to that of the photo-elements in the area to be zoomed up, each location being capable of storing the electrical signal from each photo-element and a circuit for reading out the memory row by row. The circuit reads locations in 1st and 2nd rows for the 1st scan line, in 2nd and 3rd rows for the 2nd scan line, and so forth. If the area comprises M rows, the numbers of the scan line obtained from the area are M/2 when a video signal is produced from the signal read out from the sensor and M when the video signal is produced from the signal read out from the sensor. Therefore, a picture display enlarged in the vertical direction is obtained.

6 Claims, 10 Drawing Sheets

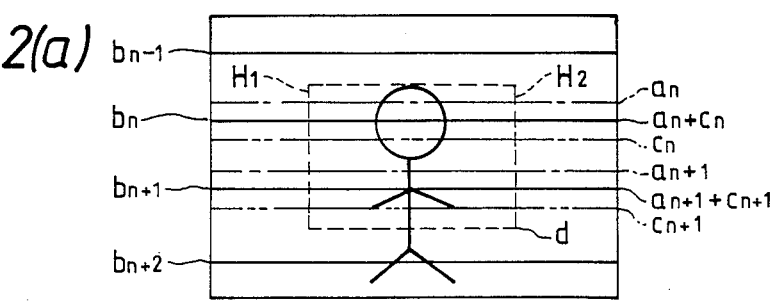
FIG. 2(a)
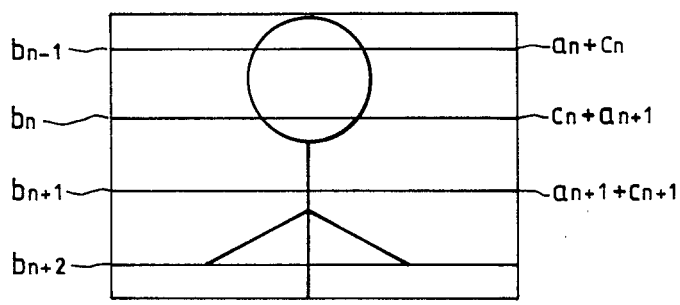
FIG. 2(b)
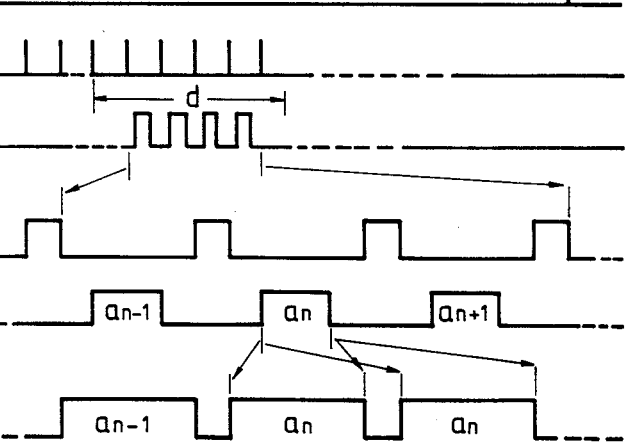
FIG. 3(a)
FIG. 3(b)
FIG. 3(c)
FIG. 3(d)
FIG. 3(e)
FIG. 3(f)

IMAGE SENSOR DEVICE CAPABLE OF ELECTRONIC ZOOMING

FIELD OF THE INVENTION

The present invention relates generally to an image sensor device, and more paticularly to an image sensor of the solid state type capable of electrically zooming in on an object or scene.

BACKGROUND OF THE INVENTION

An example of a known MOS imager is described in "A solid state color video camera with a horizontal read out MOS imager" (IEEE Transactions on Consumer Electronics, vol. CE-32, No. 3, August 1986). An arrangement of four color filters as described in this article shown in FIG. 16 of the accompanying drawings. Colors of filters covering photodiodes are white (W), green (G), cyan (Cy) and yellow (Ye). The term (i,j) denotes a location of a photodiode at the j-th column and in the i-th row of a matrix array of photodiodes. photoelectric charges accumulated on the photodiodes covered by the filters W, G, Cy and Ye are derived from output terminals 111–114, respectively. The electric charges from photodiodes at two adjacent rows are processed at the same time. This process is sequentially performed line by line in the scan of a display picture. For instance, in the first field, elements (1,1) and (2,1), elements (1,2) and (2,2), elements (1,3) and (2,3), ... are scanned during a first horizontal period, then elements (3,1) and (4,1), elements (3,2) and (4,2), elements (3,3) and (4,3), ... are scanned during the second horizontal period, ... After the scanning of the first field is finished, the scanning of the second field is started. In the second field, elements (2,1) and (3,1), elements (2,2) and (3,2), elements (2,3) and (3,3), ... are during a first horizontal period, then elements (4,1) and (5,1), elements (4,2) and (5,2), elements (4,3) and (5,3), ... are scanned during the second horizontal period, ... Thus, an interlace scan is performed by reading out two-rows-at-a-time. A CCD imager performing an interlace scan by reading out two-rows-at-a-time is disclosed in "A CCD image sensor with parallel-serial transfer conversion circuits" (1984 National Convention Record of the Institute of Television Engineers of Japan).

In previous video cameras with solid state imagers, a zoom feature has not been considered, since the zoom feature requires the video cameras to be provided with an optical mechanism or a picture memory from which pixel (picture element) data is read out with a slower rate of scanning. The optical mechanism makes the video camera heavier and it is not suitable for a rapid zoom operation. On the other hand, an example of an electrical zoom with a memory is disclosed in Japanese laid open application No. 166279/1986; however, the picture resolution in the disclosed device is undesirable since the same pixel data is read out twice in the horizontal and vertical directions (same pixel data is used four times) to create a picture twice as large, i.e. a zoom at a ratio of 2-to-1.

It is possible to improve the resolution in the horizontal direction of a reproduced (display) picture, since it is possible to provide the photodiodes with a high density in the horizontal direction. However, it is difficult to provide the photodiodes with a high density in the vertical direction, since the density in the vertical direction depends on the density of the scan lines of the reproduced picture.

SUMMARY OF THE INVENTION

The object of the present invention is to provide a solid state image sensor having an electrical zoom feature without degrading picture resolution in the vertical direction.

According to the present invention, in an imager having a sensor array of N rows and M columns of photoelectric transducers, each capable of generating an electrical signal in response to a light intensity applied thereto, and a signal processor for generating a video signal for a scan line of a display picture, the video signal being produced from the electrical signals from the transducers in a pair of adjacent rows in the sensor array, there is provided a memory array of n rows and m columns of locations which corresponds to a sub-array, whose area is to be zoomed up. For n rows and m columns in the sensor array of N rows and M columns, each location in the memory array is capable of storing the electrical signal from each transducer in the sub-array and a circuit is provided for reading out the electrical signals stored at these locations in the rows of the memory array and for producing a video signal from said electrical signals. The rows of the memory array are read out with a shift row by row in response to a shift of a scan line of the display picture.

BRIEF DESCRIPTION OF THE DRAWINGS

FIGS. 2(a) and 2(b) are schematic diagrams showing a sensor surface of a sensor.

FIGS. 3A–3F are a timing chart for a read/write access in a memory.

FIG. 15 is a schematic diagram showing a display picture.

DESCRIPTION OF THE PREFERRED EMBODIMENTS

Various embodiments of the present invention will be described below with reference to the accompanying drawings.

Figure 1:
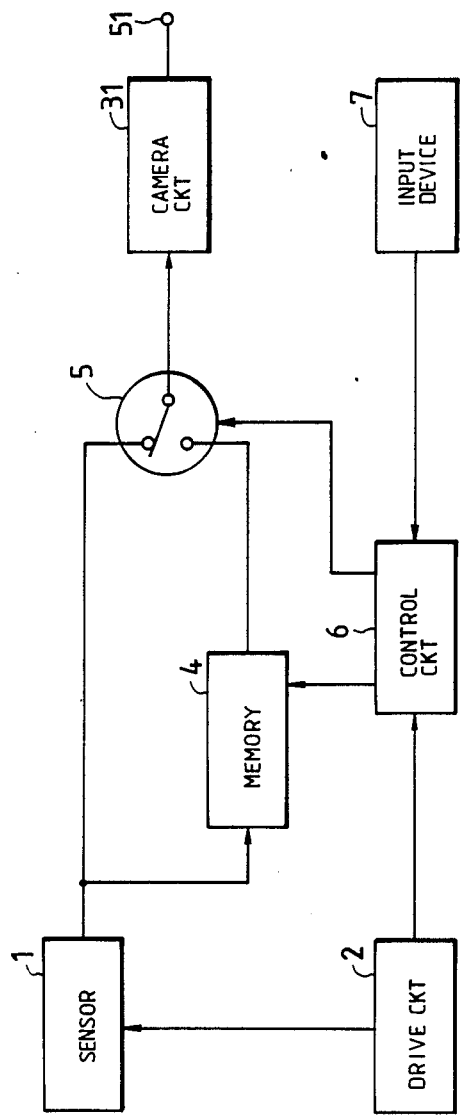
FIGS. 1 is a block diagram of an embodiment of the present invention.
Figure 16:
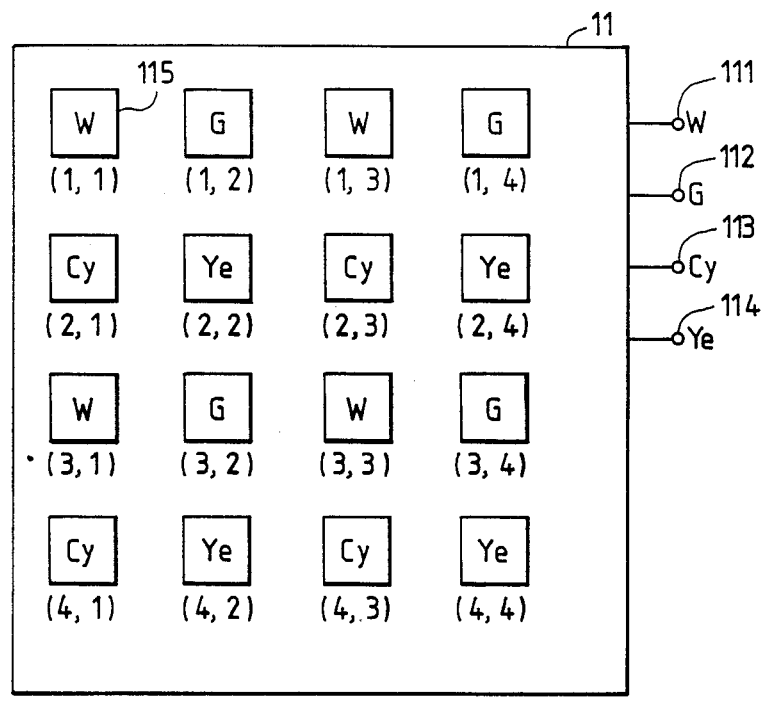
FIG. 16 is a schematic diagram showing an arrangement of picture elements of a MOS sensor.

FIG. 1 is a block diagram showing a first embodiment of the present invention, wherein reference numeral 1 denotes a sensor of a two-rows-at-a-time reading type (for example, the sensor as shown in FIG. 16), 2 denotes a driving circuit for the sensor 1, 4 denotes a memory, 5 denotes a switch (electronic switch), 6 denotes a control circuit for controlling the memory 4 and switch 5, 7 denotes an input device for inputting data to the controlling circuit 6 to control the same to perform various controlling operations, 31 denotes a camera circuit for processing a signal received from the sensor 1 to produce a video signal, and 51 denotes an output terminal of the camera circuit 31.

In the figure, it is assumed that an image of an object is focused on the sensor 1 by means of an optical system which is not shown. In a normal operation, switch 5 has the connection as shown in FIG. 1, so that signals read out from sensor by two-rows-at-a-time interlace scanning are supplied to the camera circuit 31.

The camera circuit 31, when the one shown in FIG. 16 is used as the sensor, produces a video signal for one horizontal line from W, G, Cy, Ye in a pair of adjacent rows as the picked-up image output from the sensor 1, and outputs the video signal at terminal 51. Therefore, the video signal for the i-th scan line in the first field is produced by the signals read out at photo-elements (i,j) and (i+1,j) in FIG. 16; whereas, the video signal for the i-th scan line in the second field is produced by the signals read out at photo-elements (i+1,j) and (i+2,j) in the referred to FIG. 16.

Since the memory 4 has memory locations whose number is equal to that of the photo-elements in the area to be zoomed, the memory 4 stores each output of the signals W, G, Cy, Ye from the sensor 1. In the zoom operation, the switch SW 5 is changed over to the side of the memory 4 by the control circuit 6 so that the memory 4 is driven and the stored signals W, G, Cy, Ye are read out. At this time, two rows are read at a time with successive sweeps shifted by one row pitch, whereby the camera circuit 31 is adapted for common use. More particularly, reading is performed such that row n and row n+1, row n+1 and row n+2, row n+2 and row n+3, ... are read in succession.

The case for making twofold zoom-up will be described below.

In FIG. 2(a), $a_n, a_{n+1}, \ldots, c_n, c_{n+1}, \ldots$ denote rows of picture elements. That is, for example, $a_n$ indicated by one-dot chain line in the figure represents the n-th row of picture elements for W and G, and $c_n$ indicated by two-dot chain line represent the n-th row of picture elements for Cy and Ye. Meanwhile, $b_n$ denotes a scanning line. For example, in the case of scanning for two-rows-at-a-time reading, the row $a_n$ and row $c_n$ are read along the line $b_n$, and the row $a_{n+1}$ and row $c_{n+1}$ are read along the line $b_{n+1}$. Such a relationship is shown in the figure by labeling the same solid line denoted by $b_n$ as "$a_n+c_n$".

Now, a case where the area encircled by the broken line d in FIG. 2(a) is subjected to twofold zoom-up will be explained. As shown in the figure, the area ranges from $H_1$ to $H_2$ in the horizontal direction. Data is stored in the memory 4 during the time the area d is read out of the sensor. In reading data out of the memory, when the line $b_{n-1}$ is scanned, the rows $a_n$ and $c_n$ are read, and when the line $b_n$ is scanned, the rows $a_{n+1}$ and $c_n$ are read as shown in FIG. 2(b). As a result, the scanning line is doubled and the zoom-up is achieved. Although, for the sake of convenience of explanation, it was indicated above that the rows $a_n$ and $c_n$ are read along the line $b_{n-1}$, the array of picture elements along the first scanning line of the area d are arranged to correspond to that of the first scanning line of the zoom-up picture.

While doubling in the vertical direction is achieved in the described manner, doubling in the horizontal direction may be achieved reading data out of the memory 4 in synchronism with a read clock of half the frequency of the write clock or by reading the same signal for two clock periods in succession.

FIG. 3 is a timing chart for writing data into the memory and reading it therefrom, wherein line a shows the vertical sync signal (V pulse), line b shows the horizontal sync signal (H pulse), line c shows the write pulse (W pulse) showing the timing for writing signals into the memory 4, line d shows the H pulse whose time base has been changed for describing the writing and reading timing in more detail, line e shows the write pulse, and the suffixes $a_{n-1}, a_n, \ldots$ indicate writing of the corresponding rows, line f shows the read pulse (R pulse) and the suffixes $a_{n-1}, a_n, \ldots$ indicate reading of the corresponding rows.

Referring to FIG. 3, since only the area d is stored in the memory 4, the W pulse of line c is generated in the middle of the V pulse of line a and also in the middle of the H pulse of line b, and the rows indicated in the W pulse of line a are written into the memory 4. Thereafter, the data is read out taking twice as long and two lines in succession are read as shown in the R pulse f. Although not shown in the chart, the process is performed for the rows $c_n$ and these are read in combination with $a_n$ as shown in FIG. 2(b).

Figure 4:
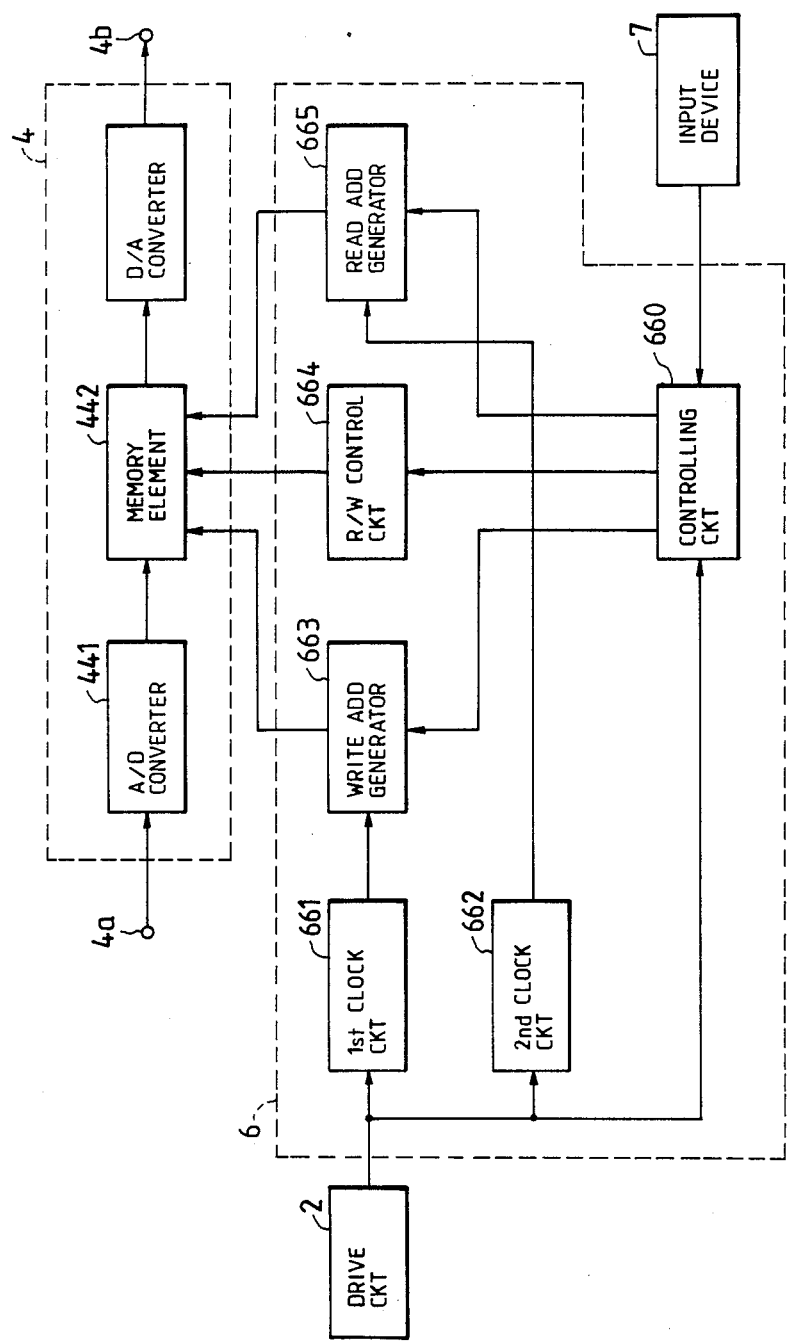
FIG. 4 is a detailed block diagram of the arrangement of FIG. 1.

FIG. 4 is a detailed block diagram of the arrangement of FIG. 1 for performing the above described operation, in which reference numerals 2, 4, 6, and 7 denote parts corresponding to those in FIG. 1 denoted by the same reference numerals, 441 denotes an A/D converter, 442 denotes a memory element, 443 denotes a D/A converter, 661 denotes a first clock circuit, 662 denotes a second clock circuit, 663 denotes a write address generator for generating a write address signal for writing data into the memory element 442, 664 denotes an R/W control circuit for controlling the writing of data into and the reading of data out of the memory element 442, 665 denotes a read address generator for generating a read address signal for reading data out of the memory element 442, 660 denotes a controlling circuit for performing such operations as setting up the area d according to a signal from the input device 7, and 4a and 4b denote the input terminal and output terminal of the memory 4, respectively.

In the arrangement of FIG. 4, the first clock circuit 661 and second clock circuit 662 generate clock signals in synchronism with the outputs of the sync signals V and W of the driving circuit 2, of which the second clock circuit 662 is adapted to generate a clock signal at half the frequency of that of the first clock circuit 661.

The write address generator 663, in response to an input from the controlling circuit 660, generates an address signal for the memory 4 according to the clock signal from the first clock circuit 661 at the timing of the scanning of the area d. At the same time, the R/W control circuit 664 performs write control for the memory 4.

In reading data from the memory 4, the read address generator 665 generates an address signal for the memory 4 according to the clock signal from the second clock circuit 662 at the timing of the scanning of the entire picture. At this time, the address signal for each row is generated twice in succession. At the same time, the R/W control circuit 664 performs read control for the memory 4.

It is seen known that the rows within the area d can be displayed through the above described operations, doubled in both vertical and horizontal directions.

While an arrangement providing only one signal, as seen from each input and output terminal 4a, 4b, was described above, that for four outputs, such as provided by the sensor shown in FIG. 16, may be formed of four sets of the above described circuits. The read timing of rows as shown in the example of scanning illustrated in FIG. 2(b) is obtained by successively changing the address generation timing in the read address generator 665 by one horizontal period.

In accordance with the present embodiment, since the row $a_n$ and the row $c_n$ always exist in each horizontal line even in the case of twofold zoom-up, it is apparent that both luminance and color signals can be produced through ordinary operation of the camera circuit 31, and hence, explanation thereof will be omitted.

Although the write operation and the read operation as described above were to be performed alternately, if the above described memory circuit is provided for each field, it is possible to perform the read operation on one memory while a write operation is carried out with another memory. Further, if the memory element 442 is a high speed memory, both operations may be performed using the same memory.

In the zoom-up picture, as described in detail hereinafter, the constituent picture data is all output during one scanning time, that is, a so-called non-interlace picture is provided. Hence, only the same data is available for the succeeding field. But, if such a signal is output to a monitor which operates to provide interlace scanning, pictures vibrating in the vertical direction will be displayed on the screen.

Figure 5:
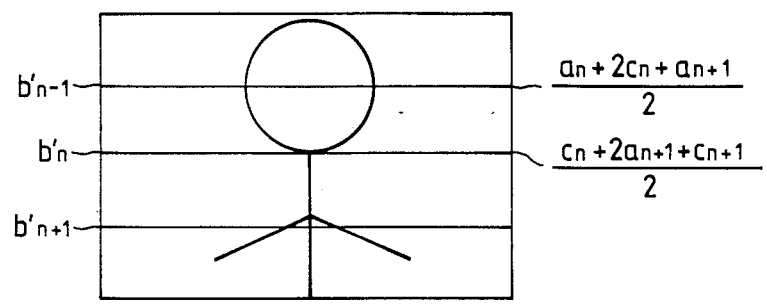
FIG. 5 is a schematic diagram showing an interlace scan of a display picture.

FIG. 5 is a schematic diagram showing a method for solving the above described problem, in which one line output in the subsequent field is formed using signals for three rows. More particularly, when luminance signals of the lines $b_{n-1}, b_n, b_{n+1}, \ldots$ in one field are produced by $a_n+c_n, c_n+a_{n+1}, \ldots$, the luminance signals of the lines $b'_{n-1}, b'_n, b'_{n+1}, \ldots$ in the succeeding field (the other field) are produced by $$\cdot \frac{a_n + 2c_n + a_{n+1}}{2}, \frac{c_n + 2a_{n+1} + c_{n+1}}{2}$$

Figure 6:
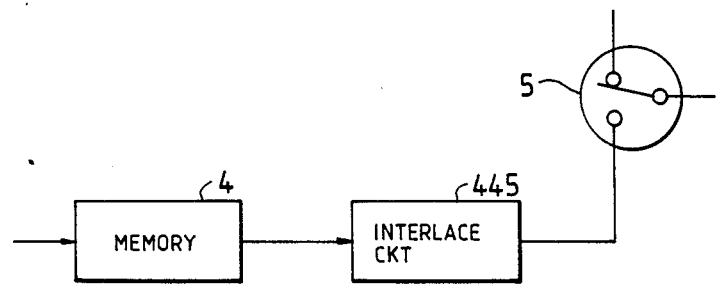
FIG. 6 is a block diagram of a part of a circuit for the interlace scan of the display picture.

FIG. 6 is a block diagram of a portion of the circuit arranged to perform the operation shown in FIG. 5, in which 445 is an interlace circuit, while the rest of the arrangement is the same as that of FIG. 1.

Meanwhile, the switch 5 in FIG. 1 and FIG. 6 is used for switching between the signals from the memory 4 and the sensor 1 so that the picture of FIG. 2(a) and the picture of FIG. 2(b) may be displayed juxtapositionally. Here, by changing the address generating timing from the read address generator 665 and the address, a display can be produced in which a desired area in the picture of FIG. 2(b) is cut out and placed in a desired Position in the picture of FIG. 2(a).

Description of the above arrangement will be given later.

In the above described embodiment, each line in a zoom-up picture is produced by addition of the corresponding rows, and this is done so as to suppress occurrence of moire due to different filter spectral sensitivities for picture elements in each row. However, each row may of course be used as the output for one line in making a zoom-up picture to thereby improve vertical resolution. An example of an arrangement for such a purpose will be described below. Meanwhile, the position in which the memory 4 is placed can be either in the stage preceding the camera circuit 31 or in a following stage, each of which may constitute an embodiment.

Figure 7:
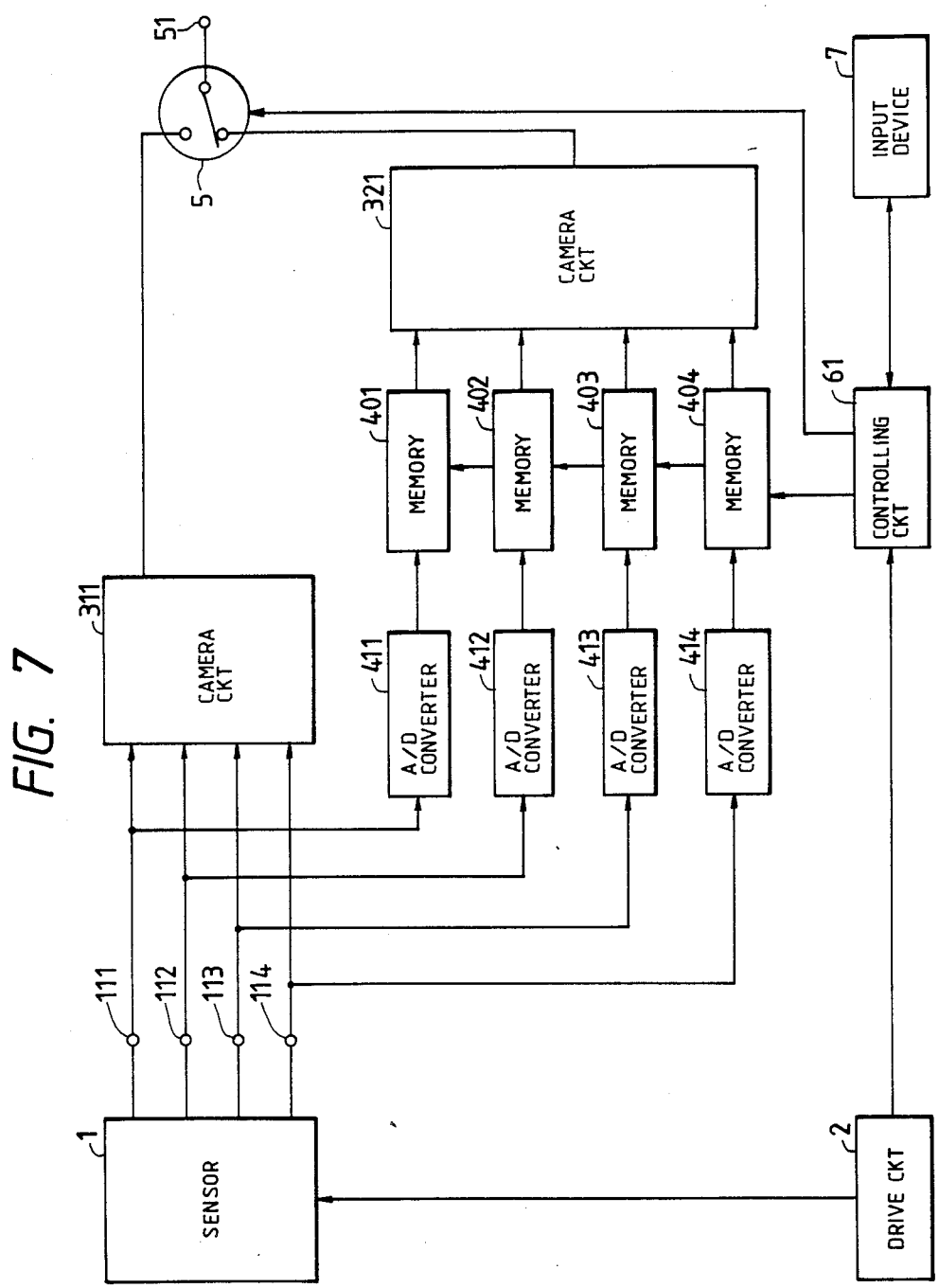
FIG. 7 is a block diagram of another embodiment of the present invention.

FIG. 7 is a block diagram of a second embodiment of the present invention in which an output of picture elements is adapted to be stored in the memory before being subjected to processing, wherein reference numeral 311 denotes a camera circuit for processing four-line outputs of the sensor 1 into a video signal, 411 to 414 denote A/D converters, 401 to 404 denote memories, 321 denotes a camera circuit for producing a video signal corresponding to each row of the sensor from outputs of the memories 401 to 404, and 61 denotes a controlling circuit for controlling the memories 401 to 404 and the switch SW 5 in response to information from the input device 7, so that a zoom-up video signal is produced, and also for switching between this signal and the ordinary video signal output from the camera circuit 311 is performed.

Figure 8A:
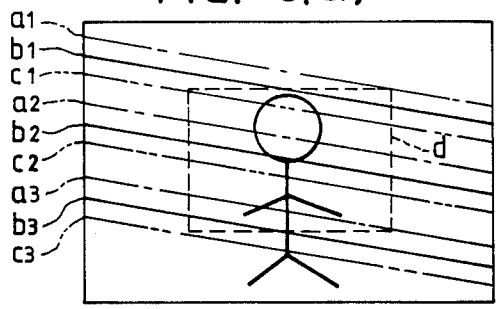
FIGS. 8a, 8b, 9, 10a, 10b, 11, 12, 15a, and 15b are schematic diagrams showing the display pictures.
Figure 8B:
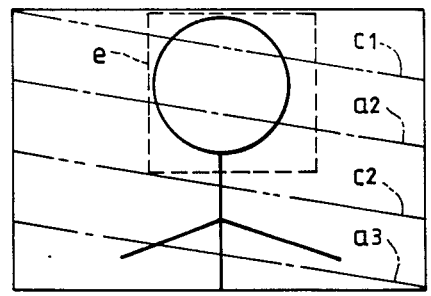

FIG. 8(a) and FIG. 8(b), which help to explain the operation of FIG. 7, show monitor screens at the times when an ordinary picture is output and a twofold zoom-up picture is output, respectively. They also represent an array of picture elements on the sensor 1. FIG. 8(a) schematically shows a picture for one field, in which b1, b2, b3, ... indicate horizontal scanning lines. To schematically illustrate interlace scanning, inclined lines are used.

In FIG. 8(a), since the sensor is a two-rows-at-a-time reading sensor, the line b1 is a composite signal of the picture elements in the rows a1 and c1, the line b2 is a composite signal of the picture elements in the rows a2 and c2, and so forth. By these outputs, a picked up image as shown in FIG. 8(a) is formed. Meanwhile, the picture element signals of each row are stored in the memories 401 to 404 by means of the A/D converters 411 to 414.

Figure 9:
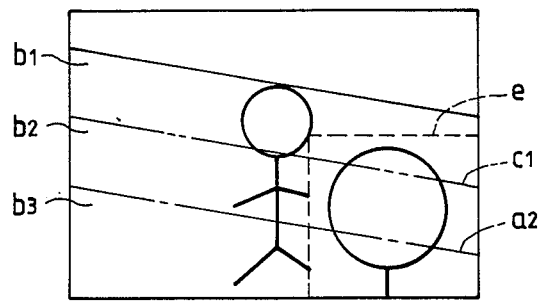

In the case where the portion encircled by the broken line d in FIG. 8(a) is stored, data in the rows c1, a2, c2, a3 shown in FIG. 8(b) are stored in the memories 401 to 404. Now, assuming that the row a is the row for W and G and the row c is the row for Cy and Ye, the data is stored in such a sequence that the data in the row c1 is stored in the memories 403 and 404, the data in the row a2 is stored in the memories 401 and 402, . . . . The operation for providing two-fold zoom-up is performed by reading out the recorded memory data in the sequence of c1, a2, c2, ... at twice the speed as the recording speed. By so doing, a twofold zoom-up picture as shown in FIG. 8(b) is obtained. Further, by suitably controlling the drive of the memories 401 to 404 and the switching operation of the switch SW 5 during picture display, a so-called two-picture display, an image in which one picture is the zoom-up picture, can be obtained as shown in FIG. 9. This is obtained by first storing the picture as shown in FIG. 8(b), then, during the course of scanning along the lines b1, b2, ... in FIG. 8(a), reading out the area encircled by the broken line e to output the same by means of the switch SW 5. According to the present invention, an electronically zoomed picture or a picture juxtaposed with it can be easily provided while suppressing any deterioration in resolution.

The essentials of the present invention relate to how a high quality zoom-up picture can be obtained by using the output of a two-rows-at-a-time reading sensor. Therefore, the present invention can be made as shown in FIG. 4 as to its concrete arrangement by those skilled in the art if such things as the sequence of reading and arrangement around the memory are clearly shown, and hence, detailed description of the memories 401 to 404, A/D converters 411 to 414, camera circuits 311 and 321, etc. will be omitted. (This consideration shall be also applicable to the description given hereinafter.)

While the method for producing a luminance signal is made clear from the foregoing description, the color signal is also easily produced as described below. That is, in the case of the embodiment of FIG. 7, data from picture elements W, G, Cy, and Ye are recorded in the memories 401 to 404. When the row a2 in FIG. 8(b) is reproduced, while the luminance of the row a2 is produced from the outputs of the memories 401 and 402 as the data for the row a2 itself, the color of the row a2 can be obtained by simultaneously reading and providing the data in the memories 403 and 404 as the data of the immediately preceding or succeeding row c1 or c2.

A method of obtaining a zoom-up picture, for one field, was described above. Since the video output is interlaced, the pair of rows read at one time are different from field to field. This will be described according to FIG. 10.

Figure 10A:
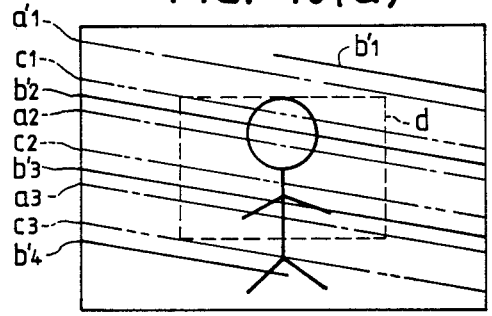

FIG. 10(a) shows scanning on the surface of the image picked up one field after the field shown in the FIG. 8(a). In FIG. 10(a), a pair of c1 and a2, c2 and a3, ... are read out. At this time, picture element data in the area d, which is the same as shown in FIG. 8(b), is input to the memories 401 to 404. As shown in the figure, the rows of horizontal picture elements corresponding to each horizontal line are different because of the interlace scanning, and therefore, the timing of the signals appearing at the output terminals 111 to 114 of the sensors become different from the preceding field. But, since the position of the area d and the fact that the fields are different are known, the picture element data in the same rows c1, a2, ... as shown in FIG. 8(b) can be easily stored in the memories 401 to 404. These memory contents are schematically shown as a picture in FIG. 10(b), but when such data is displayed as a zoom-up signal, it follows that a picture similar to that of FIG. 8(b) is interlacedly reproduced, and hence vertically vibrating pictures are produced.

Figure 10B:
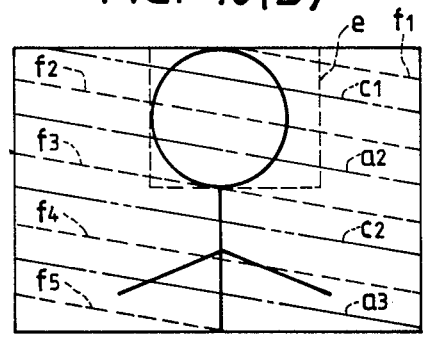

To alleviate the above described situation, a virtually interlaced image as shown by the broken lines fl, f2, f3, ... in FIG. 10(b) must be produced. To achieve this, the image signal for the line f2, for example, may be produced from the picture element data of the row c1 and the row a2. The same should be provided for other lines. The process may be performed first by storing the same data in the memories 401 to 404 and then by executing the virtual interlace reproduction Such a process must of course be performed also in the with the case of display two pictures juxtapositionally as shown n FIG. 1.

Figure 11:
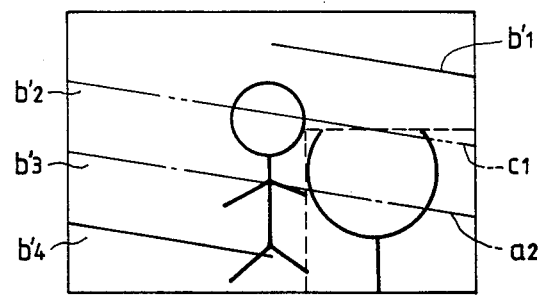

Then, if as with the case f FIG. 9 where the row c1 for the line b2, the row a2 for the line b3, ... are read from the memories 401 to 404 and displayed, the row c1 for the line b2', the row a2 for the line b3', ... are displayed as shown in FIG. 11, the zoom-up pictures will vibrate up and down as apparent from comparison of the two figures. In order to prevent this, a virtual interlace display may be adopted as in the case of FIG. 10(b). Namely, by displaying f1 in FIG. 10(b) instead of c1 in FIG. 11, displaying f2 in FIG. 10(b) instead of a2 in FIG. 11, ..., a smooth two-picture display can be attained as shown in FIG. 12.

Figure 13:
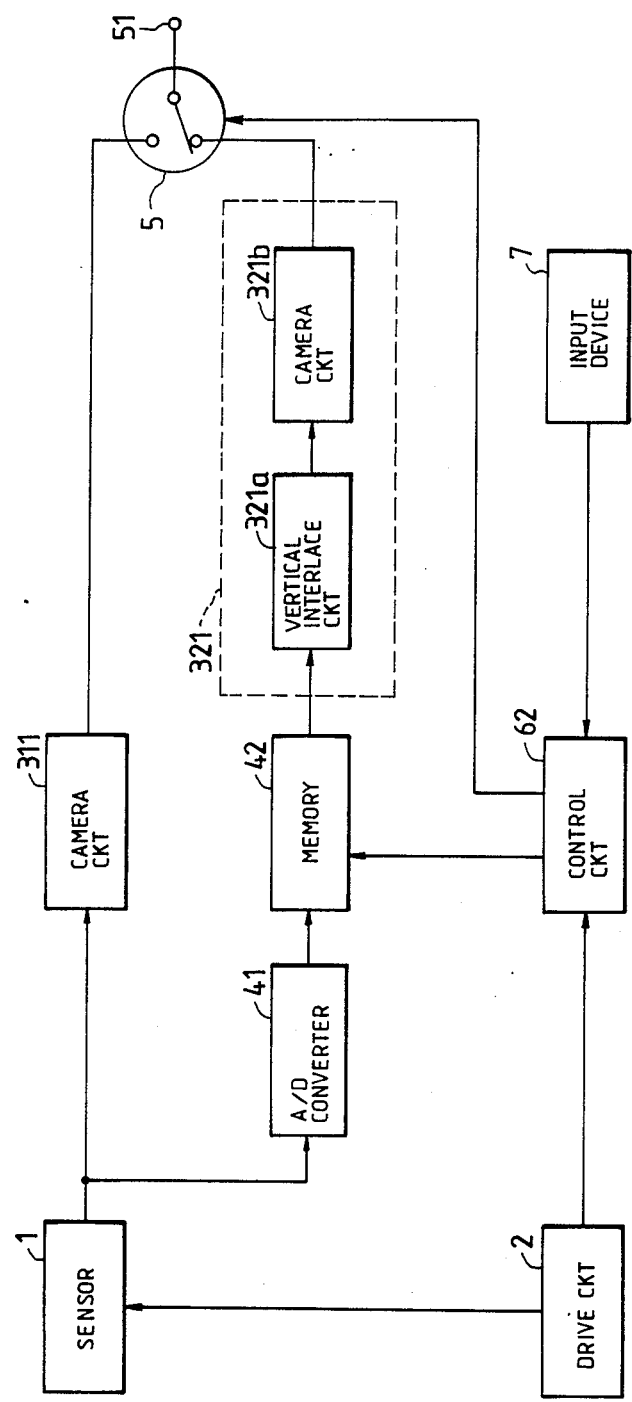
FIG. 13 is a block diagram of another embodiment of the present invention.

FIG. 13 is a block diagram of a third embodiment of the present invention for performing the above described operation. Referring to the figure, reference numeral 41 denotes an A/D converter, 42 denotes a memory, 321a denotes a virtual interlace circuit, 321b denotes a camera circuit, and 62 denotes a control circuit for controlling the memory 40 for the operations from recording of picture element data to reading of the signal for virtual interlacing, as described in FIG. 8

Figure 12:
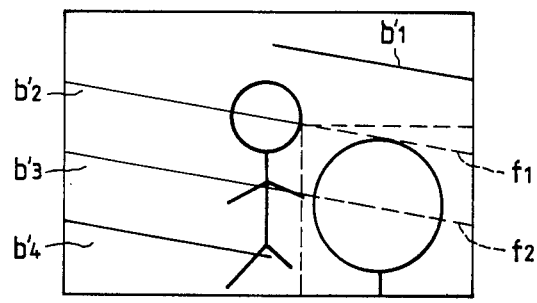

FIG. 12, and also for producing the switching signal for juxtapositional two-picture displaying, and corresponding reference numerals to those in FIG. 7 denote corresponding parts. In FIG. 13, the A/D converters 411 to 414 and memories 401 to 404 in FIG. 7 are represented, for convenience' sake, by the A/D converter 41 and memory 40.

The embodiment shown in FIG. 13 produces a virtual interlace picture, for the zoomed picture as described with reference to FIG. 10(b) by means of the virtual interlace circuit 321a and its control circuit 62, and selectively displays an ordinary picture, zoom-up picture, or juxtaposed two-picture image by means of the switch SW 5 in response to the input from the input device 7. Since the method for generating each picture from the picture element data produced by the sensor 1 has already been described, a further description thereof will be omitted here.

Although the production of a zoom-up picture with the use of the picture element data before being processed was described in the foregoing, it is of course possible to produce such a picture after the processing has been performed.

Figure 14:
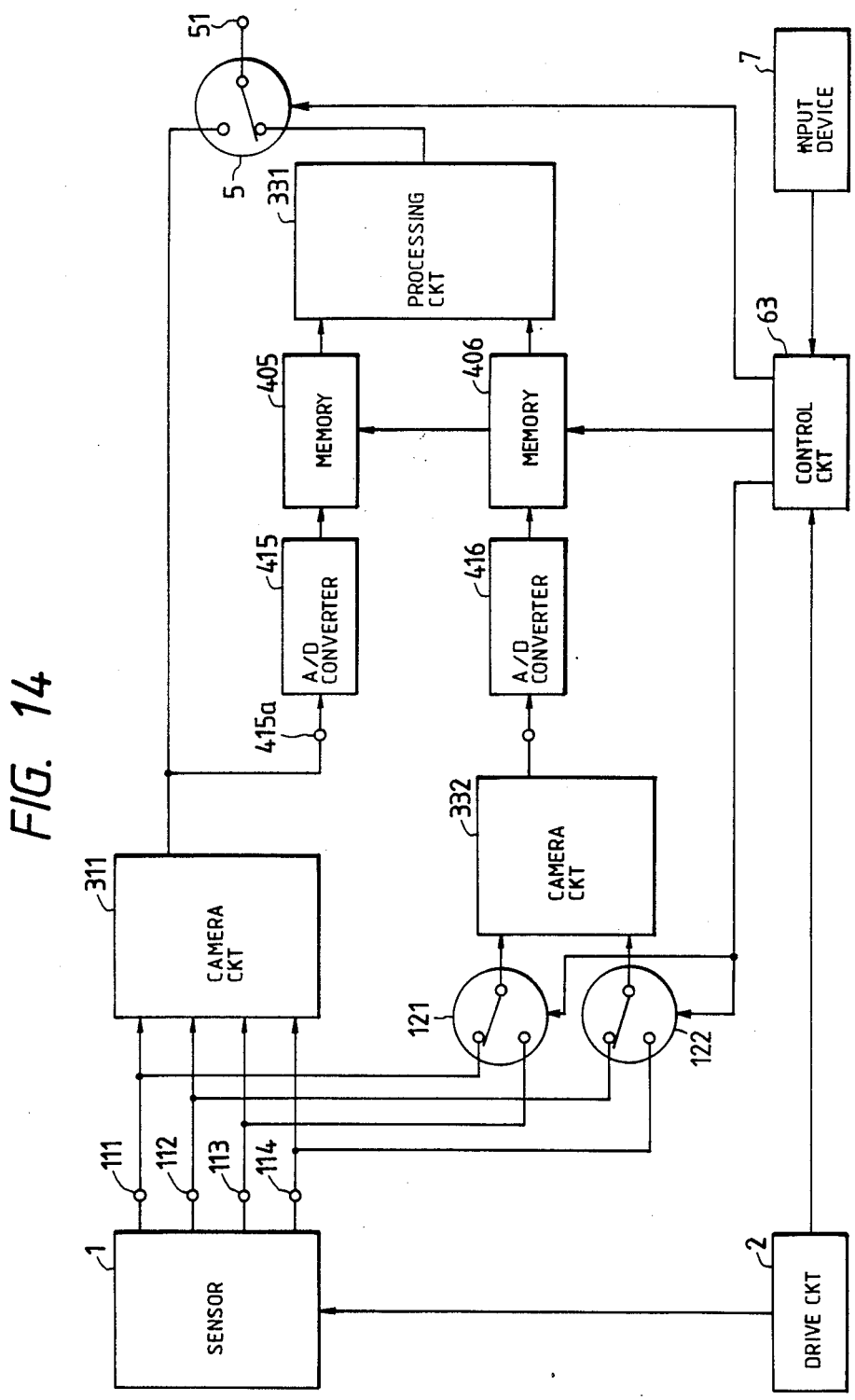
FIG. 14 is a block diagram of another embodiment of the present invention.

FIG. 14 is a block diagram of a fourth embodiment of the present invention in which a zoom-up picture is produced after the data has been processed. Referring to the figure, reference numerals 415, 416 denote A/D converters, 405, 406 denote memories, 63 denotes a control circuit, 331 denotes a processing circuit, 332 denotes a camera circuit, and 121, 123 denote switches SW. Corresponding reference numeral to those in FIG. 7 denote corresponding blocks.

Figure 15A:
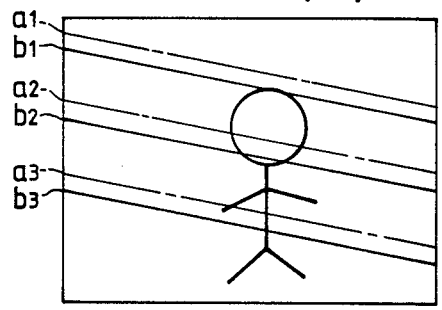
Figure 15B:
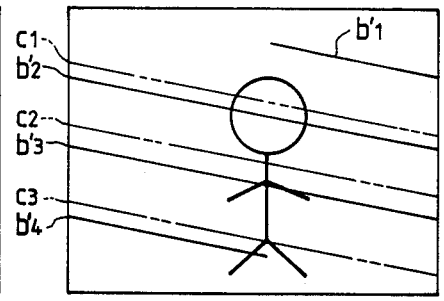

FIGS. 15(a) and 15(b) are diagrams for explaining the operation of the arrangement shown in FIG. 14.

Outputs of the camera circuit 311 in FIG. 14 are supplied to the input terminal 415a a of the A/D converter 415. These outputs are the interlace outputs obtained by two-rows-at-a-time reading as indicated by b1, b2, and b1', b2', ... in FIG. 8(a) and FIG. 10(a). These outputs for the respective fields are stored through the A/D converter 415 in the memory 405.

The camera circuit 332 receives data from the sensor 1 for the rows that are changed for each field by switching of the switches SW 121 and 122. More particularly, a1, a2, ... are received in the case where an ordinary picture is obtained by b1, b2, ..., as shown in FIG. 15(a), and c1, c2, ... are received in the case where an ordinary picture is obtained by b1', b2', ... as shown in FIG. 15(b). The data is processed by the camera circuit 332, in a manner similar to the described data processed by the camera circuit 311, and the processed data is then output to the A/D converter 416. This signal is recorded in the memory 406. When obtaining a zoom-up picture, since a signal formed by the sum total of the row a and row c is stored in the memory 405 and a signal of row a or row b dependent on the field is stored in the memory 406 by obtaining the difference of the two signal, the row a and the row c can be easily separated. This process is performed by the processing circuit 331, and in this way outputs of these rows necessary for obtaining the zoom-up picture are produced.

By such processing, the luminance signal can be easily obtained from the outputs of the memories 405 and 406. In producing the color signal, since the bandwidth in the vertical direction is not required to be as much as that for the luminance signal, the color signal output in the camera circuit 311 may be stored and it may be used for each of the row a and the row c. Otherwise, when considering columns of picture elements on the sensor 1 to be stored in the memories, at the timing when picture elements (1, 1) and (2, 1) are stored, for example, W+Cy and W are input to the memories 405 and 406, respectively, and at the timing when picture elements (1, 2) and (2, 2) are stored, G+Ye and G are input to the memories 405 and 406, respectively, meaning that W, G, Cy, and Ye can be separated from each other by obtaining their differences. By using these signals, the color signal may be reproduced according to the method described in the embodiment of FIG. 7.

The essential point of the present invention is that, even if the signal processed into a video signal from the signal obtained by a two-rows-at-a-time reading sensor is stored, by simultaneously storing the signal produced from either one of the rows, a zoom-up picture is obtained at as high solution as that obtained when each row of picture elements is separately stored. Therefore, even if the line b1 and the row c1 are stored instead of the line bi and the row al in FIG. 15(a), a similar zoom-up picture can be obtained.

In view of the essentials of the present invention in that, once a video signal is produced from data of two rows as the output of a two-rows-at-a-time reading sensor and either one of the rows have been simultaneously stored, a zoom-up picture of high resolution can thereafter be obtained. Each circuit for the above described particular embodiments can be easily from the clearly described method for producing the picture signal, and hence, the concrete circuits are not specifically described. With respect to the essentials of the present invention, it is apparent that, if the sensor is capable of reading each of two rows at a time, this invention is applicable thereto. More particularly, it is applicable to CCD sensors as shown in the above cited reference and apparently applicable to other types, such as CPD sensors. Although the array of the picture elements was described as having four colors of W, G, Cy, and Ye in the embodiments of the sensor, this is not essential to the present invention. It is matter of course that the present invention is applicable, if two-rows-at-a-time reading is possible, to all types of picture element array and color filter arrangements such as a R-G-B vertical stripe filter and a W-Cy-Ye A-type filter.

While a description has been provided only as to twofold zoom-up, since signals having vertical resolution for one frame can be obtained from one field, pictures of other magnification ratios can be produced using such signals. Then, if the virtual interlace reproduction as described in the foregoing is applied to the production of a picture with such different magnification, a high quality picture output can be obtained.

As to the two-picture displaying feature, the sub-picture approximately ¼ the size of the main picture in size was described above, but the ratio is not so limited. Rather, the sub-picture may be displayed in other ratios and, besides, in other positions. When a sub-picture is arranged to be approximately ½ the main picture and is located around the bottom half of the main picture, it is possible to display pictures in the same field by having the data written into and read out of the memory within the same field. Further, with the memory capacity increased, the utility can be improved through arranging for the main picture to be displayed in a zoom-up picture, while the sub-picture displays the whole of the image sensing surface of the sensor 1. Or, a plurality of zoomed sub-pictures may be displayed included in a main picture.

We claim:

1. An integer comprising:
   a sensor array of N rows and M columns of photoelectric transducers each capable of generating an electrical signal in response to a light intensity applied thereto;
   a signal processor coupled to said sensor array for generating a video signal from electrical signals from transducers in a pair of adjacent rows in said sensor array, including a memory array of n rows and m columns of storage locations which corresponds to a sub-array, whose area is to be zoomed, of n rows and m columns in said sensor array of N rows and M columns, each storage location in said memory array being capable of storing an electrical signal from each transducer in said sub array, and means for reading out said electrical signals stored at said storage locations in said rows of said memory array and for producing said video signal from said electrical signals, said rows of said memory array being read out with a shift row by row in response to a shift of a scan line of a display picture.

2. An imager according to claim 1, wherein said read out means includes means for sequentially of said memory array during each line scan period in said display picture.

3. An imager according to claim 1, wherein said read out means includes means for reading out said electrical signals stored at storage locations in two adjacent rows in said memory array during each line scan period of said display picture and means for combining said electrical signals from said two adjacent rows to produce a video signal.

4. An imager according to claim 3, wherein said read out means includes luminance processor for producing a luminance signal from said electrical signal read out from one of said two adjacent rows.

5. An imager according to claim 1, wherein said read out means includes means for reading out said electrical signals stored at storage locations in two adjacent rows in said memory array during each line scan period, for combining said electrical signals from said two adjacent rows to produce a video signal in one field of a display picture, for reading out said electrical signals stored at storage locations in three adjacent rows including said two adjacent rows in said memory array during each line scan period and for combining said electrical signals from said three adjacent rows to produce said video signals in another field of a display picture.

6. An imager according to claim 1, wherein said read out means includes means for reading out said electrical signals stored at locations in two adjacent rows in said memory array during each line scan period, for combining said electrical signals from said two adjacent rows to produce a video signal in one field of a display picture and for producing said video signal from said electrical signal read out from one of said two adjacent rows without that from another of said two adjacent rows in another field of said display picture.

* * * * *